(12) United States Patent
Zhou et al.

(10) Patent No.: US 10,247,320 B2
(45) Date of Patent: Apr. 2, 2019

(54) PRESSURE REGULATING VALVE

(71) Applicant: FISHER JEON GAS EQUIPMENT (CHENGDU) CO., LTD., Chengdu, Sichuan (CN)

(72) Inventors: Biao Zhou, Sichuan (CN); Zhongyang Xiao, Sichuan (CN)

(73) Assignee: FISHER JEON GAS EQUIPMENT (CHENGDU) CO., LTD., Chengdu (CN)

( * ) Notice: Subject to any disclaimer, the term of this patent is extended or adjusted under 35 U.S.C. 154(b) by 0 days.

(21) Appl. No.: 15/328,419

(22) PCT Filed: Jul. 22, 2015

(86) PCT No.: PCT/CN2015/084849
§ 371 (c)(1),
(2) Date: Jan. 23, 2017

(87) PCT Pub. No.: WO2016/011952
PCT Pub. Date: Jan. 28, 2016

(65) Prior Publication Data
US 2017/0219111 A1  Aug. 3, 2017

(30) Foreign Application Priority Data

Jul. 22, 2014 (CN) .......................... 2014 1 0372694
Jul. 22, 2014 (CN) ...................... 2014 2 0426126 U

(51) Int. Cl.
*F16K 17/30* (2006.01)
*F16K 37/00* (2006.01)
(Continued)

(52) U.S. Cl.
CPC .......... *F16K 17/30* (2013.01); *F16K 37/0008* (2013.01); *G05D 16/02* (2013.01); *G05D 16/0683* (2013.01)

(58) Field of Classification Search
CPC ......... Y10T 137/7812; Y10T 137/7809; Y10T 137/7828; Y10T 137/783; Y10T 137/782;
(Continued)

(56) References Cited

U.S. PATENT DOCUMENTS 847,944 A * 3/1907 Hubner et al. ..... G05D 16/0655
137/484.8
2,788,798 A * 4/1957 Mueller ............. G05D 16/0694
137/329.4
(Continued)

FOREIGN PATENT DOCUMENTS

CN 103244725 A 8/2013
CN 103256395 A 8/2013
(Continued)

OTHER PUBLICATIONS

International Search Report for Application No. PCT/CN15/84849, dated Oct. 13, 2015.
(Continued)

*Primary Examiner* — Jessica Cahill
(74) *Attorney, Agent, or Firm* — Marshall, Gerstein & Borun LLP

(57) ABSTRACT

A pressure regulating valve including an actuator and a valve body. Communicating passages are arranged between a chamber of the valve body and a chamber of the actuator. Further, a pressure tapping tube is disposed in the chamber of the valve body. One end of the pressure tapping tube is connected to the communicating passage and the other end of the pressure tapping tube is suspended. By adopting this pressure tapping structure in the pressure regulating valve, the performance of the pressure regulating valve in a flow accuracy range is improved.

10 Claims, 5 Drawing Sheets

(51) Int. Cl.
*G05D 16/02* (2006.01)
*G05D 16/06* (2006.01)

(58) Field of Classification Search
CPC ............... Y10T 137/7831; F16K 17/30; F16K 37/0008
See application file for complete search history.

(56) References Cited

U.S. PATENT DOCUMENTS

| | | | | |
|---|---|---|---|---|
| 2,827,069 A | | 3/1958 | Peterson | |
| 3,012,573 A | * | 12/1961 | Peterson | G05D 16/0683 137/505 |
| 3,580,271 A | * | 5/1971 | Farrer | G05D 16/0694 137/458 |
| 3,705,599 A | * | 12/1972 | Sheward | G05D 16/0688 137/116.5 |
| 3,971,410 A | * | 7/1976 | St. Clair | G05D 16/0694 137/116.5 |
| 4,069,839 A | * | 1/1978 | Hughes | G05D 16/0686 137/505.46 |
| 4,195,656 A | * | 4/1980 | Kanerva | G05D 16/0688 137/458 |
| 8,256,452 B2 | * | 9/2012 | Hawkins | G05D 16/0688 137/505.46 |
| 8,336,574 B2 | * | 12/2012 | Kranz | G05D 16/0683 137/484.4 |
| 8,500,092 B2 | * | 8/2013 | Quijano | F16K 25/00 137/505 |
| 8,739,819 B2 | * | 6/2014 | Foust | G05D 16/02 137/484.8 |
| 2008/0258096 A1 | | 10/2008 | Hawkins | |
| 2009/0261281 A1 | * | 10/2009 | Mevius | F16K 31/165 251/118 |

FOREIGN PATENT DOCUMENTS

| | | |
|---|---|---|
| CN | 103277553 A | 9/2013 |
| CN | 204114266 U | 1/2015 |
| JP | 2004110177 A | 4/2004 |

OTHER PUBLICATIONS

Extended European Search Report for EP 15824208.1 dated Feb. 5, 2018.

\* cited by examiner

PRESSURE REGULATING VALVE

CROSS-REFERENCE TO RELATED APPLICATIONS

This application is a U.S. National Stage Entry of PCT Patent Application No. PCT/CN2015/84849 filed Jul. 22, 2015, entitled "Pressure Regulating Valve," which claims the priority benefit of Chinese Application No. 201410372694.1, filed Jul. 22, 2014, and Chinese Application No. 201420426126.0, filed Jul. 22, 2014. The entire disclosure of each of these applications is hereby expressly incorporated by reference herein for all uses and purposes.

FIELD OF THE DISCLOSURE

The present disclosure relates to the field of fluid control and specifically relates to a pressure regulating valve, in particular to an internal pressure tapping type pressure regulating valve.

BACKGROUND

In an internal pressure tapping type pressure regulator, a pressure tapping passage is typically in communication with a valve body and the downstream of an actuator, since downstream pressure needs to be directly tapped in the pressure regulator. FIG. 1 is a schematic diagram of a conventional pressure regulating valve with a straight-through type internal pressure tapping structure and FIG. 2 depicts the straight-through type internal pressure tapping structure in greater detail. In FIG. 1 and FIG. 2, an internal pressure tapping passage 12 is a passage through which downstream gas enters a lower chamber of the actuator to sense downstream pressure. FIG. 7 illustrates a curve 1 that represents a performance curve of the straight-through type internal pressure tapping structure shown in FIGS. 1 and 2. From the curve 1, it can be seen that the performance of the pressure regulator in a flow accuracy range is very poor and pressure drop is too fast.

SUMMARY

To solve the above-mentioned problem, the present disclosure provides a pressure regulating valve that has an internal pressure tapping structure that improves the performance of the pressure regulator in a flow accuracy range.

An exemplary aspect of a pressure regulating valve of the present disclosure includes an actuator and a valve body, wherein communicating passages are arranged between a chamber of the valve body and the chamber of the actuator. A pressure tapping pipe is further disposed in the chamber of the valve body, with one end of the pressure tapping pipe connected with the communicating passage and the other end of the pressure tapping pipe is suspended.

In further accordance with the foregoing exemplary aspect, the pressure regulating valve may further include any one or more of the following preferred forms In one preferred form, there are at least two communicating passages and the pressure tapping pipe is connected with at least one of the communicating passages.

In another preferred form, the suspended end of the pressure tapping pipe is arranged in a direction along a gas or fluid flow direction.

In another preferred form, the chamber of the valve body includes a pressure inlet chamber and a pressure outlet chamber, and the pressure tapping pipe is disposed in the pressure outlet chamber.

In another preferred form, the pressure regulating valve includes a valve rod and a valve seat, wherein the actuator is capable of pushing the valve seat to move in the pressure inlet chamber or the pressure outlet chamber through one end of the valve rod, and a guide device is sleeved on the valve rod, wherein the guide device is disposed between the valve body and the actuator, and the communicating passages can be arranged on the guide device.

In another preferred form, the communicating passages are distributed on two symmetrical sides of an axis of the valve rod.

In another preferred form, the guide device may be integrally molded with the actuator.

In another preferred form, the communicating passages are cylindrical holes.

In the exemplary aspect provided by the present disclosure, arranging the passage in communication with the chamber of the valve body, the chamber of the actuator, and the pressure tapping pipe to sense the downstream pressure of the valve body, slows the pressure drop of the pressure regulator in the flow accuracy range.

DETAILED DESCRIPTION OF THE DRAWINGS

Figure 3:
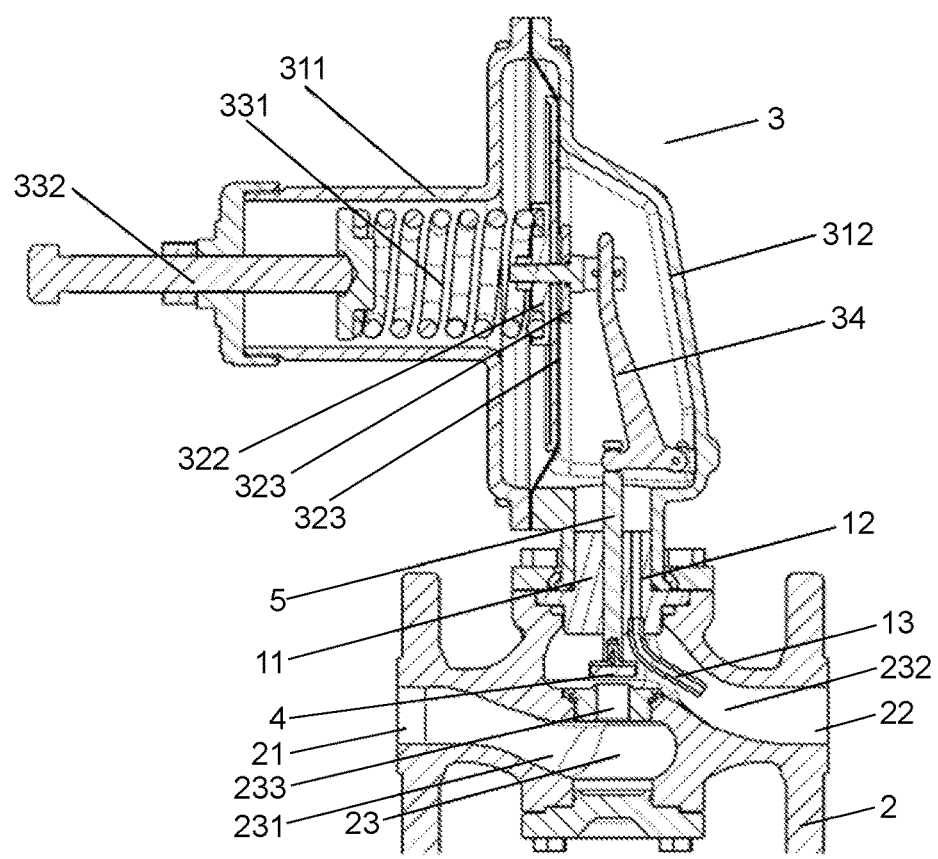
FIG. 3 is a schematic diagram of an example of a pressure regulating valve with a single-hole internal pressure tapping structure having a pressure tapping pipe constructed in accordance with the teachings of the present disclosure.

FIG. 3 is a schematic diagram of an example of a pressure regulating valve with an internal pressure tapping structure having a pressure tapping pipe constructed in accordance with the teachings of the present disclosure. The pressure regulating valve includes a valve body 2, an actuator 3, a valve seat 4, a valve rod 5, a guide device 11, and a pressure tapping pipe 13. The valve body 2 includes a pressure inlet 21, a pressure outlet 22, and a valve chamber 23. The actuator 3 is fixedly connected to the valve body 2. The valve seat 4 is movably disposed in the valve chamber 23. The valve rod 5 includes a first end and a second end, the first end of the valve rod is placed in the actuator 3, the second end of the valve rod is fixed to the valve seat 4, and the valve rod 5 and the valve seat 4 can jointly move along an axial direction of the valve rod 5. The guide device 11 is fixed to the actuator 3 or the valve body 2. When the valve rod 5 moves, the guide device 11 guides the valve rod 5.

Figure 4:
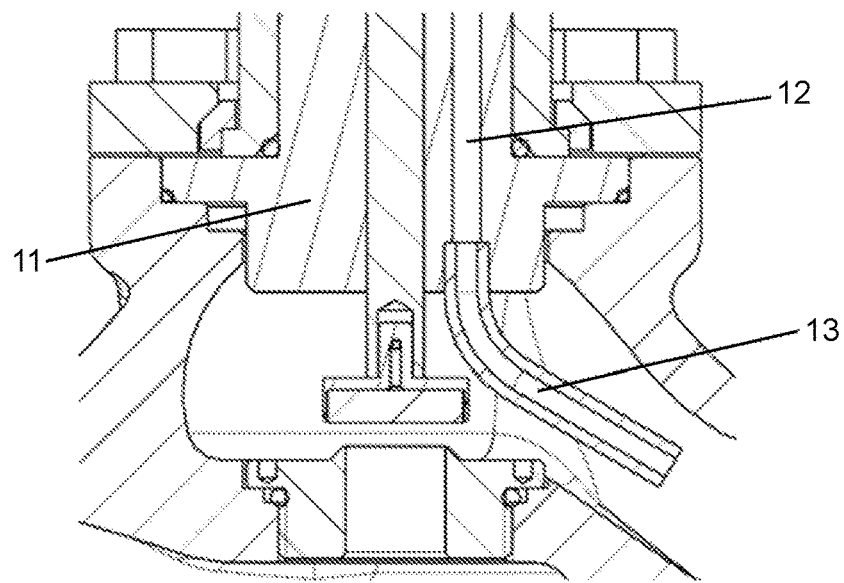
FIG. 4 shows the single-hole internal pressure tapping structure of FIG. 3.

As shown in FIG. 3 and FIG. 4, the internal pressure tapping structure of the pressure regulating valve includes a passage 12 in communication with the actuator 3, the valve chamber 23, and the pressure tapping pipe 13. Further, the passage 12 is disposed in the guide device 11. One end of the pressure tapping pipe 13 is in communication with the valve chamber 23 and the other end of the pressure tapping pipe 13 is in communication with the passage 12.

The valve chamber 23 includes a pressure inlet chamber 231 in communication with the pressure inlet 21, a pressure outlet chamber 232 in communication with the pressure outlet 22, and a valve port 233 in communication with the pressure inlet chamber 231 and the pressure outlet chamber 232. Since the pressure is the outlet pressure of the pressure regulating valve, the pressure tapping pipe 13 is preferably placed in the pressure outlet chamber 232 (because the pressure outlet chamber is located on the pressure outlet side).

The inlet pressure of the pressure regulating valve provided by the present disclosure may be a gas pressure, in some examples, and may be a liquid pressure, in other examples. Accordingly, the outlet pressure may be a gas pressure, in some examples, and may be a liquid pressure, in other examples. In one example, the pressure tapping pipe is arranged along a gas or fluid flow direction, which may facilitate a better pressure tapping effect.

Figure 7:
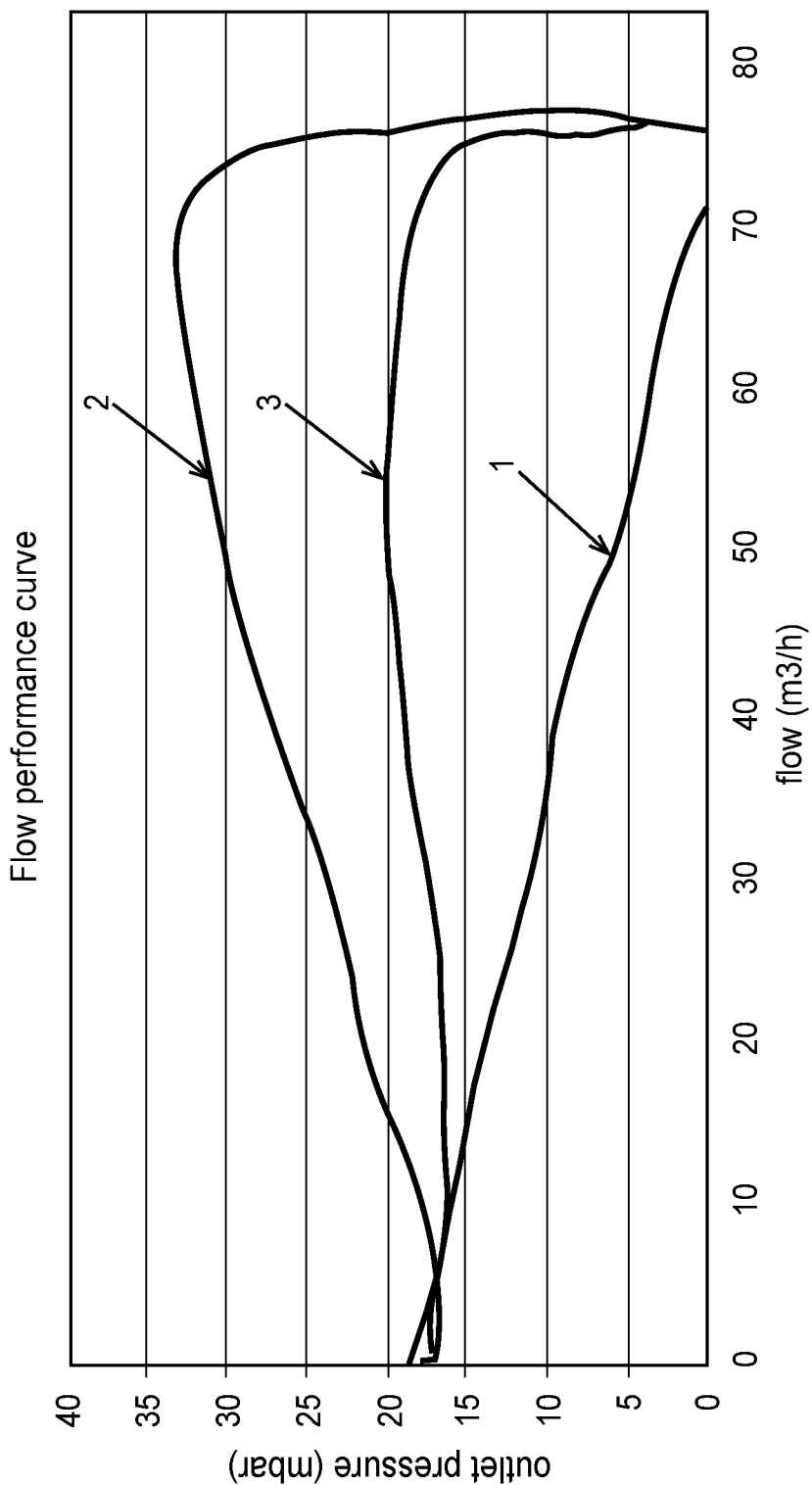
FIG. 7 is a performance curve chart showing the flow performance of the three pressure tapping structures shown in FIG. 1, FIG. 3 and FIG. 5, respectively.

As shown in FIG. 7, a curve 2 represents a performance curve of the performance of the single-hole internal pressure tapping structure of FIG. 3. FIG. 7 shows the performance of the pressure regulating valve of FIG. 3 is poor in the flow accuracy range and has a pressure rise that is too great.

Figure 6:
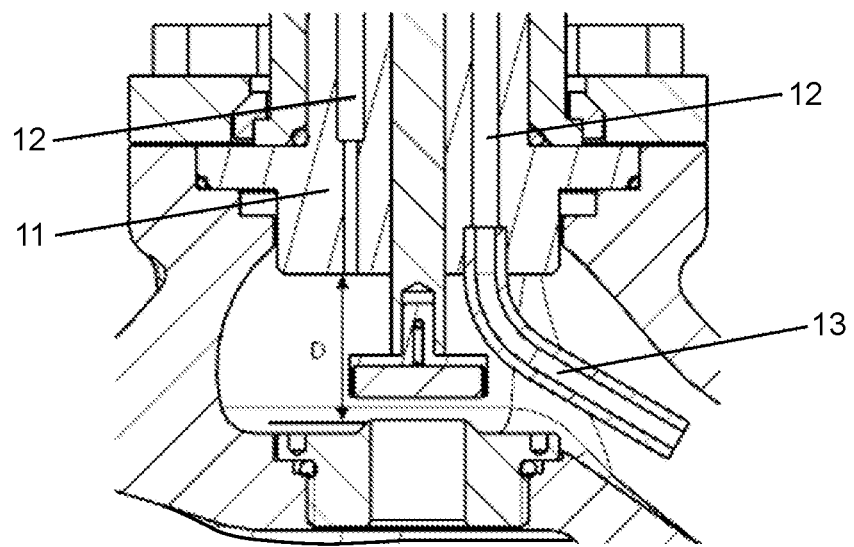
FIG. 6 shows the dual-hole internal pressure tapping structure of FIG. 5.

Further, another pressure tapping passage may be formed on the other side of the valve rod opposite to the pressure tapping passage corresponding to the pressure tapping pipe, as shown in FIG. 6. In such an example, the two passages are able to tap pressure simultaneously which may result in better performance of the pressure regulator in the flow accuracy range.

Specifically, in one example, the internal pressure tapping structure of the pressure regulating valve includes two passages 12 disposed on the guide device 11 and in communication with the actuator 3 and the valve chamber 23, wherein one passage 12 is in communication with the pressure tapping pipe 13. Preferably, the two passages are respectively disposed on two sides of an axis of the valve rod, as the obtained pressure tapping effect may be better in case of symmetrical distribution.

Figure 1:
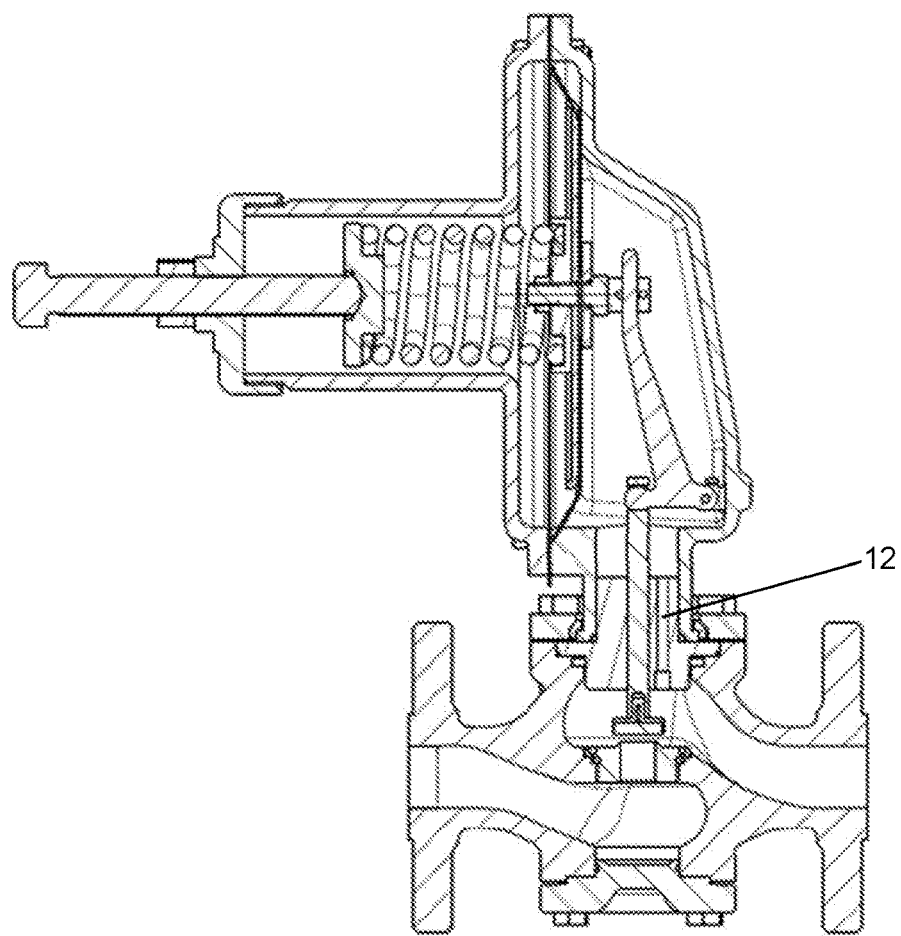
FIG. 1 is a schematic diagram of a conventional pressure regulating valve with a straight-through type internal pressure tapping structure.
Figure 2:
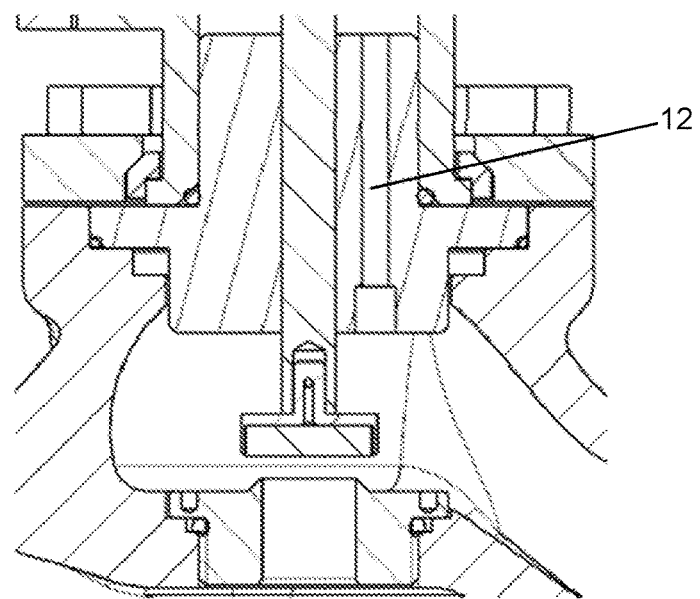
FIG. 2 shows the straight-through type internal pressure tapping structure in FIG. 1.
Figure 5:
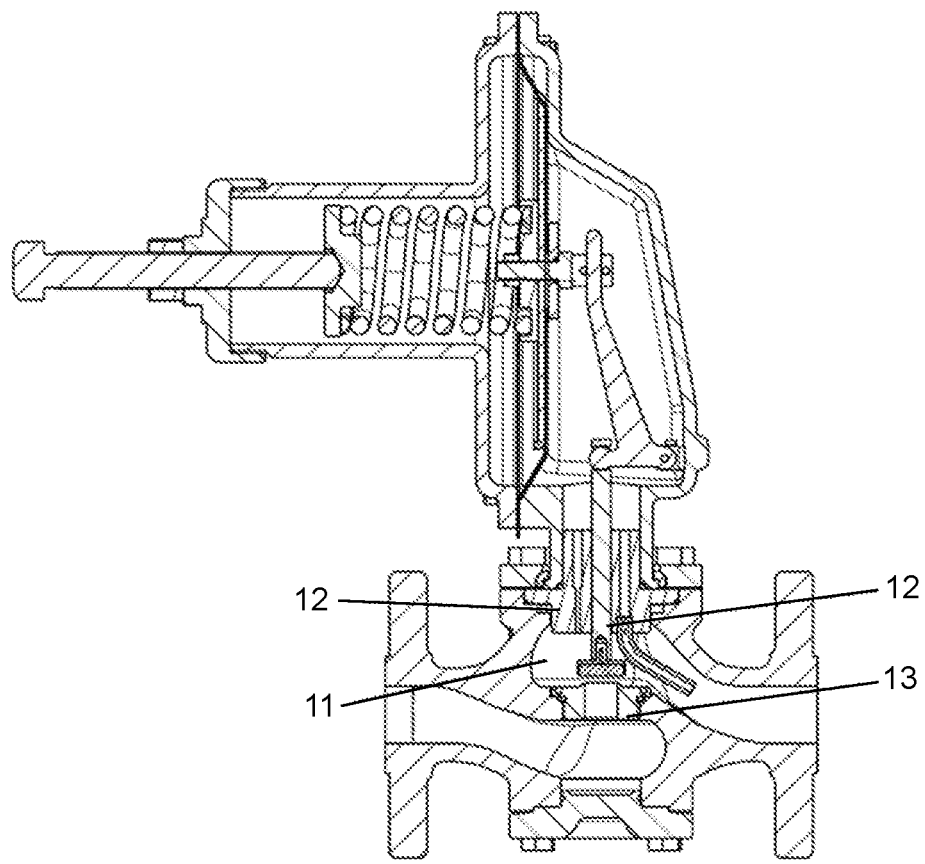
FIG. 5 is a schematic diagram of an example of a pressure regulating valve with a dual-hole internal pressure tapping structure having a pressure tapping pipe constructed in accordance with the teachings of the present disclosure.

FIG. 5 depicts an example of the pressure regulating valve having dual-hole pressure tapping. As shown in FIG. 7, a curve 3 represents a performance curve of the performance of the dual-hole internal pressure tapping structure of FIG. 5. Comparing curve 1 and curve 2 with curve 3 from FIG. 7 indicates that the performance of the pressure regulating valve of FIG. 5 in the flow accuracy range improved as compared to the performance of the pressure regulating valves of FIG. 1 and FIG. 3.

It will be appreciated that the position of the pressure tapping passage is not fixed in the design process and can be adjusted according to different requirements. In addition, the size and the number of the pressure tapping passages can also be adjusted according to different performance requirements. In other words, in some examples, more than two pressure tapping passages can be utilized and the pressure tapping pipe may be in communication with only one passage.

The vertical distance from the valve port to the pressure tapping passage can be adjusted, in some examples, to obtain performance which better suits the performance requirements. In FIG. 6, for example, D refers to the vertical distance from the valve port 233 to the pressure tapping passage 12 and the value of D may be adjusted according to the required performance in the design process of the valve.

In one example, the guide device 11 may also be integrally molded with the actuator 3. In one example, valve seat 4 connected to the valve rod 5 may be a rubber pad.

The above-mentioned description is a detailed description of the pressure regulating valve, as shown in FIG. 3, to which the internal pressure tapping structure of the present disclosure is applied. Description is made below to other parts of the pressure regulating valve of FIG. 3.

As shown in FIG. 3, the actuator includes a diaphragm cap assembly, a diaphragm assembly, a pressure regulating device, and a lever. The diaphragm cap assembly includes a first diaphragm cap 311 and a second diaphragm cap 312. The first diaphragm cap 311 is connected to the pressure regulating device, the second diaphragm cap 312 is connected to the valve body 2, and the first diaphragm cap 311 and the second diaphragm cap 312 together form a hollow internal portion. The diaphragm assembly includes a diaphragm 321, a first diaphragm plate 322, and a second diaphragm plate 323. The diaphragm 321 is pressed between the first diaphragm plate 322 and the second diaphragm plate 323 and, further, the diaphragm 321 is located between the first diaphragm cap 311 and the second diaphragm cap 312. Moreover, the first diaphragm plate 322 is disposed within a cavity formed between the diaphragm 321 and the first diaphragm cap 311, and the second diaphragm plate 323 is disposed within a cavity formed between the diaphragm 321 and the second diaphragm cap 312. The pressure regulating device includes a spring 331 and a regulating rod 332. The spring 331 is disposed inside of the first diaphragm cap 311 and the regulating rod 332 includes a third end and a fourth end. The third end of the regulating rod 332 penetrates the first diaphragm cap 311 and is in contact with the spring 331. The fourth end of the regulating rod 332 is suspended and the regulating rod 332 is fixed on the first diaphragm cap 311. As shown in FIG. 3, the lever 34 includes three connecting ends, i.e., a fifth end, a sixth, end and a seventh end. The fifth end of the lever 34 is movably connected to the diaphragm assembly, the sixth end of the lever 34 is movably connected to the first end of the valve rod 5, and the seventh end of the lever 34 is movably connected to the second diaphragm cap 312.

It will be appreciated that in other examples, the lever in FIG. 3 can also link other parts or the structure may not utilize such a lever.

As depicted in FIG. 3, gas or liquid enters the valve through the pressure inlet chamber 231 from the pressure inlet 21, and a user can set the needed outlet pressure by adjusting the spring force through the regulating rod 332 as desired. Due to the spring force and the downstream pressure of the valve body (the downstream pressure of the valve body changes), the diaphragm 321 moves leftwards and rightwards to drive the lever 34 to rotate, such that the valve rod 5 is driven to move vertically and the size of the opening of the valve seat 4 is adjusted to change the downstream pressure until the outlet pressure is stable.

FIG. 3 depicts one example of the guide device 11, wherein the guide device 11 is an independent part that is fixed to the second diaphragm cap 312 and the valve body 2. In another example, the guide device 11 may also be integrally molded with the second diaphragm cap 312 but is not an independent part, as shown in FIG. 8.

The internal pressure tapping structure of the present disclosure may also be applied to pressure regulating valves with any structure and is not limited to the pressure regulating valve with the structure shown in FIG. 3. For example, as depicted in FIG. 8, the pressure regulating valve has no lever but still has the dual-hole internal pressure tapping structure with the pressure tapping pipe. In the interest of brevity, components that are common to both FIG. 8 and FIG. 3 are referred to using the same reference characters utilized in FIG. 3.

Figure 8:
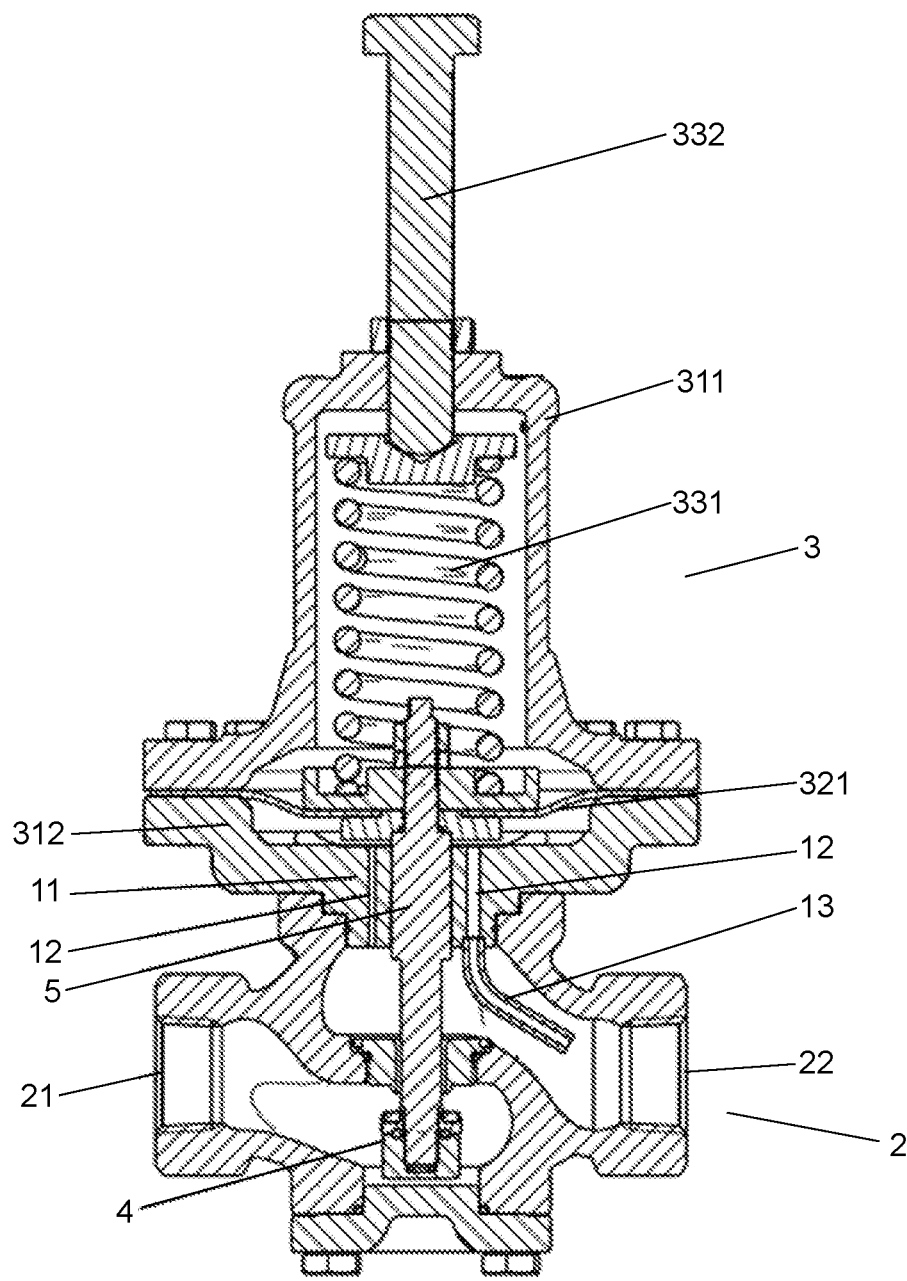
FIG. 8 is a schematic diagram of another example of a pressure regulating valve with a dual-hole internal pressure tapping structure having a pressure tapping pipe constructed in accordance with the teachings of the present disclosure.

With respect to the shape of the pressure tapping passage, as the passages shown in FIG. 3, FIG. 5, and FIG. 8 are cylindrical holes. In other examples, however, the pressure tapping passages may also be rectangular holes or holes having other shapes. In FIG. 3 only one pressure tapping passage is employed, and the diameters of the upper and the lower portions are the same. In FIG. 5 two pressure tapping passages are employed, and the diameters of the upper and lower portions of the pressure tapping passage connected with the pressure tapping pipe are the same and the diameter of the upper portion of the passage on the pressure inlet side is larger than the diameter of the lower portion thereof. Finally, in FIG. 8 two pressure tapping passages are employed, and the diameters of the upper and lower portions of each passage are the same, but the diameter of the passage on the pressure inlet side is smaller than the diameter of the passage on the pressure outlet side. It will be appreciated that the influence of the same equivalence and difference of the diameters of the upper and lower portions of the pressure tapping passages on the performance of the pressure regulating valve in the flow accuracy range is not obvious; when the diameter of the passages is larger, the performance curve tends downwards; and the longer the pressure tapping pipes are, the more the performance curve tends to be downwards.

As described above, the most important factor which influences the performance curve is whether the pressure tapping pipe on the pressure outlet side is disposed along the gas or liquid flow direction or not, and the arrangement of the positions of the pressure tapping passages does not greatly influence the performance curve.

Examples are provided to enable the present disclosure to be more complete and to comprehensively convey the protection range thereof to one skilled in the art. Many details, such as examples of specific parts, devices and methods are described to provide comprehensive understanding of the examples of the present disclosure. It is not necessary to provide details of which are obvious for one skilled in the art, and the examples described herein can be implemented in many different ways and shall not be explained as limitations to the range of the present disclosure. In some exemplary embodiments, well-known processes, well-known device structures and well-known techniques are not described in detail.

Although the terms "first", "second", "third" and the like are used herein to describe various components, parts or portions, such components, parts or portions shall not be limited by such terms; and such terms can only be used for distinguishing a component, part or portion. When terms such as "first" and "second" and other numerical terms are used herein, it does not necessitate a sequence or order, unless otherwise clearly pointed in the context. Therefore, without departing from the description of the examples, the first component, part or portion below can be explained as a term "first element, part or portion".

Although various examples of the present disclosure have already been described herein in detail, it should be understood that the present disclosure is not limited to the examples described and illustrated herein and one skilled in the art can realize other transformations and variations without departing from the present disclosure. All such transformations and variations shall fall into the range of the present disclosure. In addition, all components described herein can be replaced by other technically equivalent components.

The invention claimed is:

1. A pressure regulating valve, comprising:
a valve body,
a valve rod having a first end and a second end,
a valve seat connected to the second end of the valve rod,
an actuator coupled to the valve body, the first end of the valve rod being connected to the actuator, the actuator being configured to move the valve seat in the valve body via the valve rod to control fluid flow through the valve body,
a regulating rod have a third end and a fourth end, the third end disposed outside of the actuator and the fourth end disposed within the actuator,
a guide sleeved on the valve rod and arranged between the valve body and the actuator,
a communicating passage being arranged in the guide between a cavity of the valve body and a cavity of the actuator,
wherein a pressure tapping tube is further arranged in the cavity of the valve body, one end of the pressure tapping tube in fluid communication with the communicating passage and the other end of the pressure tapping tube is suspended,
wherein the actuator comprises:
a diaphragm cap assembly comprising a first diaphragm cap and a second diaphragm cap coupled to the first diaphragm cap, the second diaphragm cap connected to the valve body,
a diaphragm assembly comprising a diaphragm captured between the first diaphragm cap and the second diaphragm cap, and
a spring arranged in the first diaphragm cap and configured to apply a spring force on the diaphragm, and
wherein the guide has a flange that is captured between and in contact with the second diaphragm cap and the valve body.

2. The pressure regulating valve according to claim 1, wherein at least one additional communicating passage is arranged in the guide, and the pressure tapping tube is connected to at least one of the communicating passages.

3. The pressure regulating valve according to claim 2, wherein the communicating passage and the at least one additional communicating passage are distributed on two symmetrical sides of an axis of the valve rod.

4. The pressure regulating valve according to claim 1, wherein the suspended end of the pressure tapping tube is arranged in a direction along a gas or fluid flow direction.

5. The pressure regulating valve according to claim 4, wherein the cavity of the valve body comprises a pressure inlet cavity and a pressure outlet cavity, and the pressure tapping tube is arranged in the pressure outlet cavity.

6. The pressure regulating valve according to claim 5, wherein the actuator is configured to move the valve seat in the pressure inlet cavity or the pressure outlet cavity via the valve rod.

7. The pressure regulating valve according to claim 6, wherein the guide is integrally molded with the actuator.

8. The pressure regulating valve according to claim 1, wherein the communicating passage is a cylindrical hole.

9. The pressure regulating valve according to claim 1, further comprising a lever movably connected with the diaphragm assembly and the valve rod.

10. The pressure regulating valve according to claim 1, wherein the guide is removably coupled to the actuator and the valve body.

\* \* \* \* \*

UNITED STATES PATENT AND TRADEMARK OFFICE
CERTIFICATE OF CORRECTION

PATENT NO. : 10,247,320 B2
APPLICATION NO. : 15/328419
DATED : April 2, 2019
INVENTOR(S) : Biao Zhou et al.

Page 1 of 1

It is certified that error appears in the above-identified patent and that said Letters Patent is hereby corrected as shown below:

In the Specification

At Column 1, Line 57, "forms" should be -- forms. --.

In the Claims

At Column 6, Line 21, "have" should be -- having --.

Signed and Sealed this
Third Day of November, 2020

Andrei Iancu
*Director of the United States Patent and Trademark Office*